Patented Aug. 25, 1925.

1,550,805

UNITED STATES PATENT OFFICE.

HANS HARTER, OF WURZBURG, GERMANY, ASSIGNOR TO ALBERT T. OTTO & SONS, OF NEW YORK, N. Y., A CORPORATION OF NEW YORK.

PROCESS FOR THE PRODUCTION OF CATALYSTS.

No Drawing. Application filed August 29, 1921, Serial No. 496,477. Renewed December 23, 1924.

*To all whom it may concern:*

Be it known that I, HANS HARTER, residing at Wurzburg, Germany, have invented certain new and useful Improvements in a Process for the Production of Catalysts, of which the following is a specification.

This invention relates to the manufacture of catalysts for producing ammonia from its elements, more especially of catalysts containing an element of the iron group of the periodic system, for instance iron, nickel, cobalt, etc. Such catalysts have the disadvantage that they are soon changed by the action of the gases so that their catalytic activity stops or ceases. The masses frequently gradually collapse into a powder, sinter together or absorb contact poisons. Frequently they also undergo undesired chemical changes in that, for example, oxide constituents are reduced or others are oxidized.

These disadvantages are more prominent especially when using iron catalysts. It is the object of the present invention to obviate these disadvantages.

According to the present invention the catalysts are produced in such a manner by smelting under oxidizing conditions, for example, iron with one or more oxides which are not reduced or can only be reduced with difficulty by hydrogen, and a third substance which is capable of producing a glaze. The glaze thus formed protects to a certain extent the mass enclosed thereby from rapid decomposition. It contains catalytic constituents dissolved therein and therefore acts as a catalyst.

Above all things the substance producing the glaze in this case acts as a heat insulating medium and thus prevents the occurrence of a sudden heating and the consequent partial decomposition of the ammonia formed.

It has been shown in a surprising manner that a particularly active contact substance is obtained when oxides are used which are not reduced or only reduced with difficulty by hydrogen such as the oxides of molybdenum, tungsten, titanium, vanadium, thorium, magnesium and oxides which are somewhat more easily reduced such as copper oxide and in then adding these in a particular manner to the molten iron, in which case above all care must be taken that also the easily reducible oxides are protected to a certain degree before the reduction by the nitrogen-hydrogen mixture.

For the production of such contact masses the following method is preferred: For example, iron in small portions is smelted in a somewhat recessed fire-proof chamotte brick with an oxy-hydrogen flame, the oxygen or the hydrogen being used in excess as required. The flame is so directed that a certain quantity of the chamotte is caused to melt at the same time as the iron. In this manner two layers of the molten mass are formed, one of iron being specifically heavier and one of the molten chamotte mass being specifically lighter. These two molten masses are mixed intimately together by energetically stirring. Into this molten mass and while continually stirring metal oxides such, for example, as those of molybdenum, tungsten, titanium, vanadium, thorium, magnesium or other oxides such as silicon oxide are introduced until the melt is to a certain extent completely saturated thereby; preferably more easily reducible oxides, such as copper oxide, are also added. After introducing the oxides the whole mass is energetically mixed together until it solidifies.

The contact mass thus produced actually consists of two portions, one of pure molten iron and iron oxide which so to speak, forms a contact carrier and the other of chemical compounds of iron, molybdenum and other elements (oxygen or silicon from the chamotte mass and so forth) as the actual contact substance which encloses the first part in the form of a glaze. Instead of smelting the iron on a support of chamotte, chamotte flour may be stirred into the molten metal. Instead of fire-proof chamotte, clay sand, kieselguhr and so forth may be used.

The fusion point of the final mass lies between 1200 and 1400° C., and under certain conditions above this temperature.

The following analyses give a few examples of the composition of the contact masses produced according to this process.

|  | I. | II. | III. | IV. |
|---|---|---|---|---|
| K$_2$O | 1.35 | 1.0 | 1.09 | 2.31 |
| MgO | 2.10 | 1.05 | 1.23 | 0.73 |
| CaO | 4.70 | 3.32 | 4.40 | 4.36 |
| FeO | 9.00 | 6.10 | 8.08 | 8.72 |
| Al$_2$O$_3$ | 5.70 | 2.80 | 3.13 | 3.21 |
| MoO$_3$ | 13.15 | 21.60 | 16.15 | 25.26 |
| SiO$_2$ | 17.18 | 15.78 | 15.46 | 15.43 |
| Fe | 35.25 | 45.54 | 43.02 | 35.92 |
| Mo | 10.00 | 0.71 | 4.70 | 3.00 |
| SO$_3$ | 2.00 | 2.30 | 2.30 | 1.06 |
|  | 100.43 | 100.20 | 99.56 | 100.00 |

|  | V. | VI. | VII. | VIII. |
|---|---|---|---|---|
| K$_2$O | 2.27 | 0.97 | 0.90 | 0.89 |
| MgO | 3.12 | 0.91 | 0.60 | 1.13 |
| CaO | 4.90 | 3.44 | 2.81 | 1.77 |
| FeO | 32.70 | 21.25 | 25.47 | 11.57 |
| Al$_2$O$_3$ |  | 0.91 | 0.98 | 0.92 |
| MoO$_3$ | 34.92 | 38.86 | 43.87 | 49.14 |
| SiO$_2$ | 15.81 | 16.50 | 13.00 | 12.29 |
| Fe |  | 12.01 | 11.18 | 21.48 |
| SO$_3$ | 5.30 | 3.78 | 2.00 | 1.50 |
|  | 99.02 | 98.63 | 100.81 | 100.69 |

In order to reduce the mass in size the melt is preferably stirred until it solidifies in the form of a broken or crumbly mass. The contact mass produced according to the invention can not only be kept for an extremely long time but also possesses a high catalytic action. If it is allowed to act at 400° C. on a mixture of nitrogen and hydrogen under 50–70 atmos. pressure, then a gas mixture of 12–20% by volume of ammonia is obtained. Hitherto it has only been possible to obtain such a yield by using a considerably higher pressure and much higher temperatures. As however, for this purpose more expensive and dangerous devices and therefore higher costs of working are necessary the higher the temperatures and pressures that must be used it will be seen that the efficiency of the ammonia synthesis according to the invention is quite considerably improved.

I claim:—

1. The herein described process of producing a contact mass for the synthesis of ammonia, consisting in smelting a metal of the iron periodic group with an oxide which is not easily reduced by hydrogen, together with a third substance for producing a glaze.

2. The herein described process of producing a contact mass for the synthesis of ammonia, consisting in smelting a metal of the iron periodic group with an oxide which is not easily reduced by hydrogen, together with a third substance for producing a glaze and retaining the melt in a molten condition until the glaze is saturated with the oxide.

3. The herein described process of producing a contact mass for the synthesis of ammonia, consisting in smelting a metal of the iron periodic group with an oxide which is not easily reduced by hydrogen, together with a third substance for producing a glaze and in stirring the melt until it solidifies.

4. The herein described process of producing a contact mass for the synthesis of ammonia, consisting in smelting a metal of the iron periodic group with an oxide which is not easily reduced by hydrogen in presence of oxides which can be easily reduced by hydrogen and of a substance capable of producing a glaze.

In testimony whereof I affix my signature.

HANS HARTER.